(12) United States Patent
Grissom et al.

(10) Patent No.: US 11,808,372 B1
(45) Date of Patent: Nov. 7, 2023

(54) DISC COOLANT VALVE WITH SELF-LEVELING FLOW CONTROL DISC

(71) Applicant: Hanon Systems, Daejeon (KR)

(72) Inventors: Emma Michelle Grissom, Howell, MI (US); Edward William Sanders, III, Monroe, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/047,846

(22) Filed: Oct. 19, 2022

(51) Int. Cl.
| F16K 3/08 | (2006.01) |
| F16K 11/07 | (2006.01) |
| F16K 11/074 | (2006.01) |

(52) U.S. Cl.
CPC .............. F16K 3/08 (2013.01); F16K 11/074 (2013.01)

(58) Field of Classification Search
CPC .. F16K 11/072; F16K 11/074; F16K 11/0743; F16K 3/08; F16K 3/06; F16K 3/10; F16K 2200/501; F16K 2200/50
See application file for complete search history.

(56) References Cited

U.S. PATENT DOCUMENTS

| 5,950,576 | A | * | 9/1999 | Busato | ...................... | F01P 7/16 |
| | | | | | | 137/625.46 |
| 9,410,628 | B2 | | 8/2016 | Bachofer | | |
| 9,638,340 | B2 | | 5/2017 | Bachofer | | |
| 9,803,759 | B2 | | 10/2017 | Bachofer | | |
| 2008/0258093 | A1 | * | 10/2008 | Shay | ......................... | F16K 3/04 |
| | | | | | | 251/208 |
| 2015/0233476 | A1 | * | 8/2015 | Bachofer | ............... | F16J 15/447 |
| | | | | | | 251/319 |
| 2019/0309862 | A1 | * | 10/2019 | Yu | ......................... | F16K 27/048 |
| 2020/0200283 | A1 | * | 6/2020 | Fujii | ..................... | F16K 11/074 |
| 2021/0180706 | A1 | * | 6/2021 | Crowther | ............ | F16K 11/0746 |
| 2022/0090698 | A1 | * | 3/2022 | Peng | ..................... | F16K 11/078 |
| 2022/0186840 | A1 | * | 6/2022 | Kimura | .............. | B60H 1/00485 |

* cited by examiner

*Primary Examiner* — Kelsey E Cary
(74) *Attorney, Agent, or Firm* — Shumaker, Loop & Kendrick, LLP; James D. Miller

(57) ABSTRACT

A rotary disc valve includes a valve housing having an inner surface defining an opening, a first housing port, a second housing port, and a third housing port. A rotary disc valve assembly is disposed within the opening and includes a fixed disc configured to remain stationary and a rotary disc configured to rotate relative to the fixed disc. The fixed disc includes a first flow opening providing selective fluid communication between the first housing port and the second housing port and a second flow opening providing selective fluid communication between the first housing port and the third housing port. The rotary disc defines a flow passage for distributing a fluid through the first flow opening and/or the second flow opening. A co-planar arrangement is maintained between engaging faces of the fixed disc and the rotary disc to form a fluid-tight seal therebetween.

18 Claims, 5 Drawing Sheets

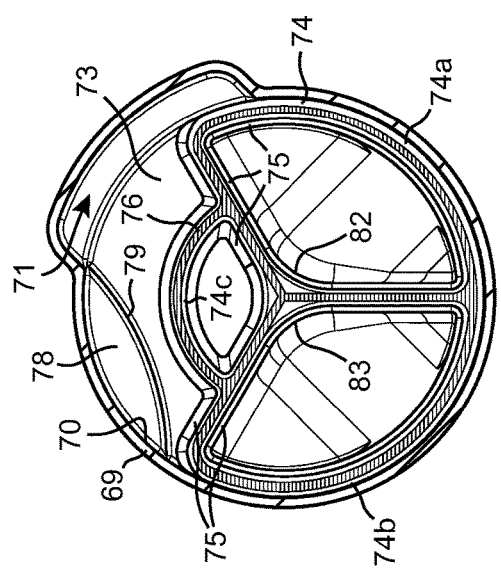
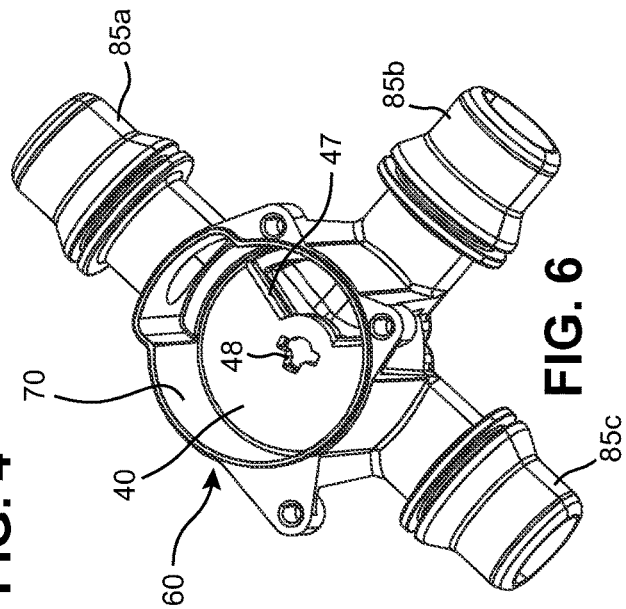
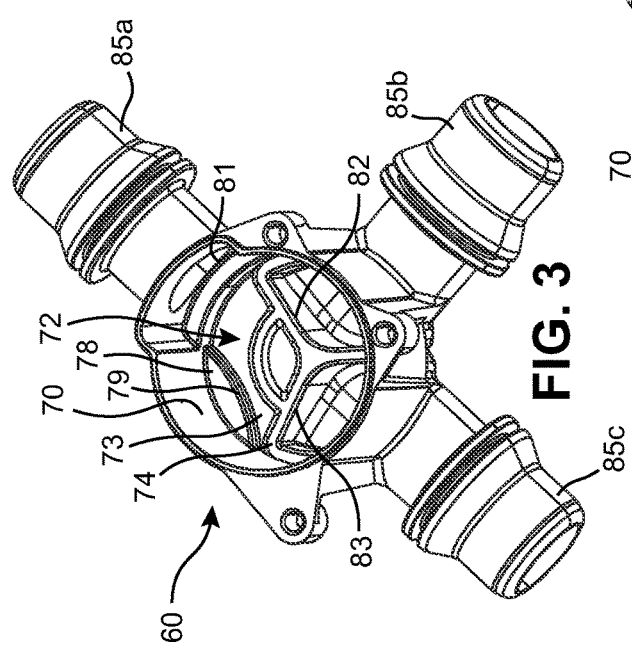
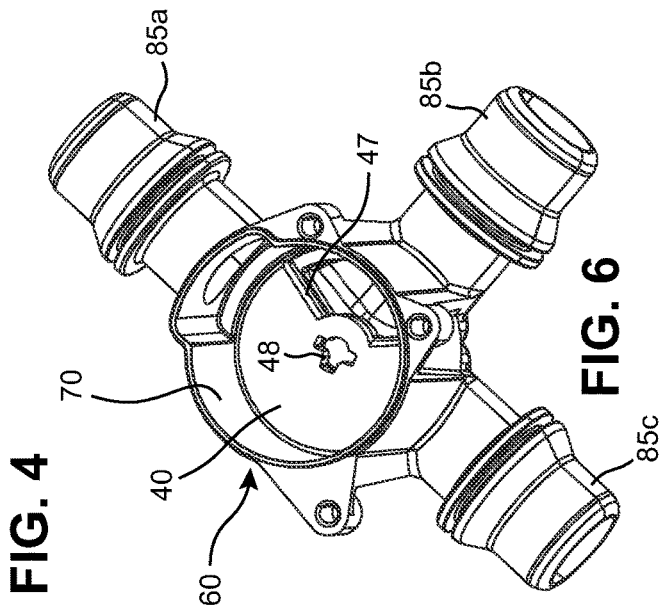

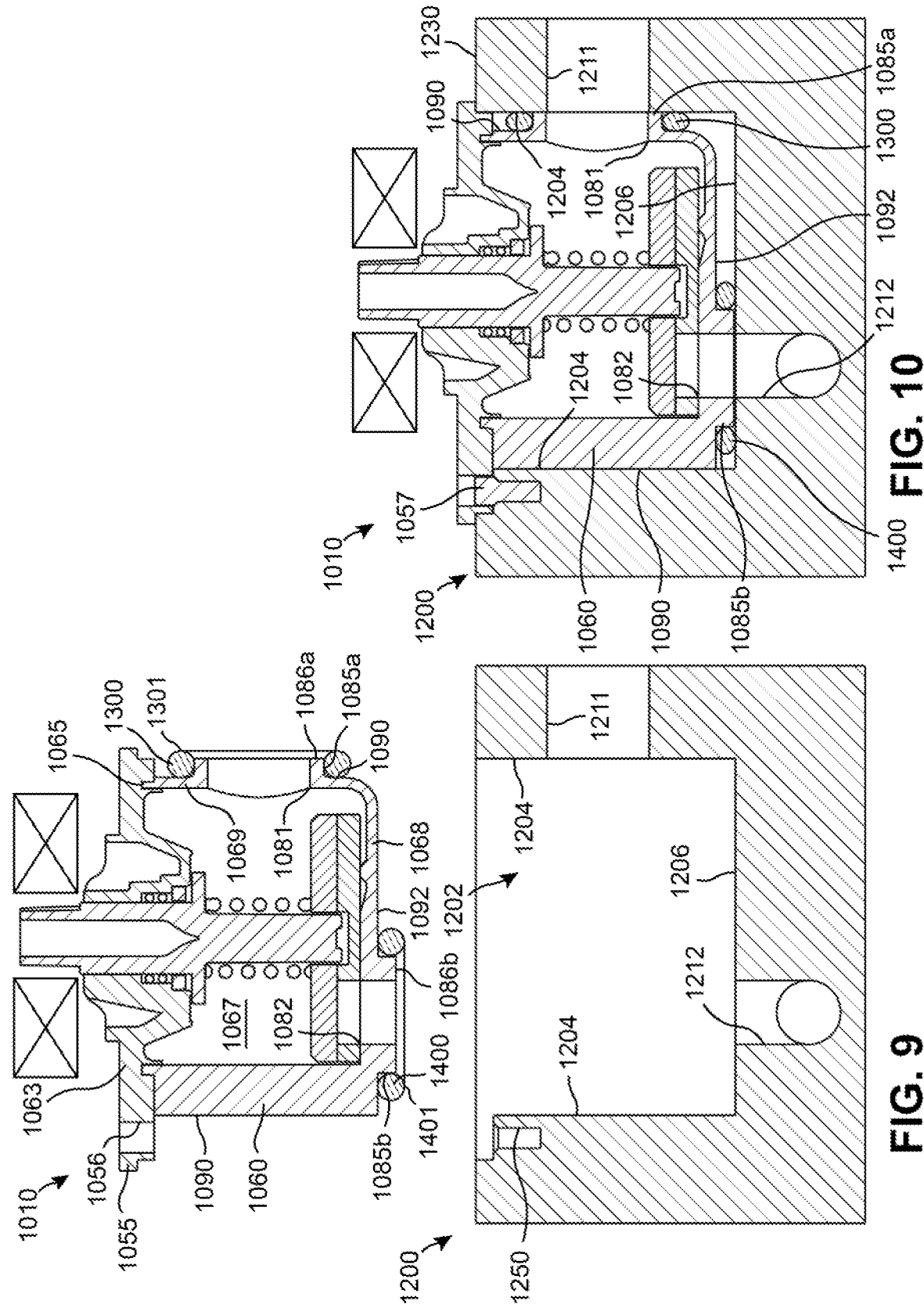

DISC COOLANT VALVE WITH SELF-LEVELING FLOW CONTROL DISC

FIELD OF THE INVENTION

The invention relates to a rotary valve, and more particularly, a rotary disc valve having a rotatable flow control disc configured to provide a fluid-tight seal relative to a fixed flow control disc during a readjustment of the rotary valve between different operational configurations thereof.

BACKGROUND

It has become increasingly common for the components forming a system of a vehicle to be provided in modular form to facilitate an ease of manufacturing of the vehicle. Such a module may include a coolant system module having multiple components associated with operation of a corresponding coolant system, such as electric coolant pumps, heat exchangers, fluid reservoir tanks, fluid characteristic sensors, valve assemblies, or the like. The coolant module may be preassembled and then received within a corresponding space within the vehicle while utilizing a minimized number of couplings and connections.

Such a coolant module may include a rotary valve for switching a flow configuration of the coolant system at a desired position therein when changing a mode of operation of the coolant system. A traditional rotary valve configuration may include a rotary valve body having a substantially axially symmetric outer surface that is received within a valve housing having a corresponding axially symmetric inner surface, such as corresponding cylindrical surfaces. The rotary valve body typically includes at least one passageway formed therethrough with at least one of the ends of each of the passageways intersecting the outer surface of the rotary valve body. Each of the passageways is configured to communicate a fluid through the rotary valve body with respect to any of a variety of different flow configurations. The valve housing in turn typically includes one or more ports intersecting the inner surface of the valve housing in order to communicate the fluid between any combination of the ports of the valve housing and the passageways of the rotary valve body. The rotary valve body may be operatively connected to a rotary actuator configured to rotate the rotary valve body relative to the stationary valve housing to cause a repositioning of each of the passageways relative to each of the stationary ports. Depending on the configuration of the rotary valve body and the valve housing, such rotation of the rotary valve body relative to the valve housing may switch which of the passageways are placed in fluid communication with the corresponding ports, including distributing the fluid proportionally to multiple different ports, or may cease flow through at least one of the passageways by placing the at least one of the passageways in alignment with a portion of the inner surface of the valve housing devoid of one of the ports.

However, the described traditional configuration of such rotary valves generally limits the applicability thereof within such drop-in modules. As one concern, it may difficult to manufacture the surfaces of the rotary valve body and the rotary valve housing to include the desired surface conditions for establishing the fluid-tight seal therebetween within the coolant module. Secondly, the use of a module also results in the potential for certain manufacturing steps performed with respect to the integrated rotary valve to be particularly difficult as the module includes a greater size and weight than the rotary valve individually, thereby leading to the need for an altered approach when reorienting and transporting the module between manufacturing steps for providing the necessary access to the rotary valve. Thirdly, the integration of the rotary valve into the module results in difficulty in testing the rotary valve independently of the operation of the remainder of the components within the module. Lastly, the integration of the rotary valve into the module may render it difficult to service the rotary valve absent the removal of the entirety of the corresponding module from the vehicle.

The traditional configuration of the rotary valve as described also presents an inherent trade-off between an effectiveness of the seal where the rotary valve body moves relative to the valve housing and an amount of torque required for accomplishing such movement while maintaining the sealing effect. Specifically, the manner in which the rotary valve body rotates relative to the valve housing requires that a suitable fluid-tight seal is established between the outer surface of the rotary valve body and the inner surface of the valve housing to ensure that the corresponding fluid does not leak into a relatively small radial gap that may be present between the valve body and valve housing, which is provided to allow for the ease of rotation of the valve body relative to the valve housing. Traditionally, such seals are established by placing a sealing element on the inner surface of the valve housing around a periphery of each of the ports. Each of the sealing elements is typically formed from a relatively soft and resilient material capable of being compressed between the inner surface of the valve housing and the outer surface of the rotary valve body to ensure that a suitable sealing effect is maintained regardless of the rotational position of the rotary valve body. The material may be an elastomeric material, for example.

Unfortunately, such sealing elements present a disadvantageous relationship wherein an increase in the sealing effect between the rotary valve body and the valve housing also tends to increase the amount of torque required to rotate the rotary valve body relative to the valve housing. This occurs because the amount of compression applied to such a sealing element in a radial direction of the rotary valve relates directly to the sealing effect provided thereby. As the degree of compression is increased, a radial force present between an inner surface of the sealing element and the outer surface of the rotary valve body also increases. This increased radial force increases the frictional forces present between the sealing element and the outer surface of the rotary valve body with respect to a circumferential direction of the rotary valve body, which in turn increases the amount of torque required to overcome such frictional forces when rotating the rotary valve body relative to the valve housing. Accordingly, the type of rotary actuator capable of supplying the desired degree of sealing effect for a given rotary valve configuration may be limited to only those rotary actuators having a corresponding torque rating, which leads to such rotary actuators being more costly while also requiring greater power to operate in the desired manner.

Accordingly, for each of the reasons outlined above, there exists a need in the art to produce a rotary valve that includes the rotation of a rotary valve body for adjusting a flow configuration through the rotary valve via the application of a reduced torque, and that is further configured as a removable component of an associated module for installation into a vehicle.

SUMMARY OF THE INVENTION

In accordance with the present disclosure, an improved rotary disc valve having a self-leveling feature for maintaining a fluid-tight seal has surprisingly been discovered.

According to an embodiment of the present invention, a rotary disc valve includes a valve housing having an inner surface defining each of an opening, a first housing port, a second housing port, and a third housing port with each of the first housing port, the second housing port, and the third housing port providing an inlet or outlet for a fluid to enter or exit the opening of the valve housing. A rotary disc valve assembly is disposed within the opening of the valve housing and includes a fixed disc configured to remain stationary relative to the valve housing. The fixed disc includes a first flow opening providing selective fluid communication between the first housing port and the second housing port and a second flow opening providing selective fluid communication between the first housing port and the third housing port. The fixed disc includes a first face and an opposing second face. The rotary disc valve assembly further includes a rotary disc configured to rotate relative to the fixed disc about an axis of rotation of the rotary disc. The rotary disc defines a flow passage therethrough providing selective fluid communication between the first housing port and one of the first flow opening, the second flow opening, or a combination of the first opening and the second flow opening, depending on a rotational position of the rotary disc relative to the fixed disc. The rotary disc includes a first face and an opposing second face. The second face of the rotary disc is configured to maintain a co-planar arrangement with respect to the first face of the fixed disc to provide a fluid-tight seal therebetween where the first face of the fixed disc engages the second face of the rotary disc.

BRIEF DESCRIPTION OF THE DRAWINGS

FIG. 3 is a top perspective view of a valve housing of the rotary disc valve prior to installation of a rotary disc valve assembly therein;

FIG. 4 is a fragmentary cross-sectional view taken through a portion of the valve housing of FIG. 3 at an axial position of a base of a bead of sealant applied to a seal seating surface of the valve housing;

FIG. 5 is a top perspective view of the valve housing of the rotary disc valve following installation of a fixed disc therein;

FIG. 6 is a top perspective view of the valve housing of the rotary disc valve following installation of a rotary disc therein;

FIG. 9 is an elevational cross-sectional view of a rotary disc valve provided as a cartridge according to another embodiment of the present invention, wherein the rotary disc valve is shown prior to insertion into an opening of a housing structure representative of a module for use in a vehicle; and FIG. 10 is an elevational cross-sectional view showing the rotary disc valve provided as the cartridge following insertion into the opening of the housing structure.

DETAILED DESCRIPTION OF THE INVENTION

Figure 1:
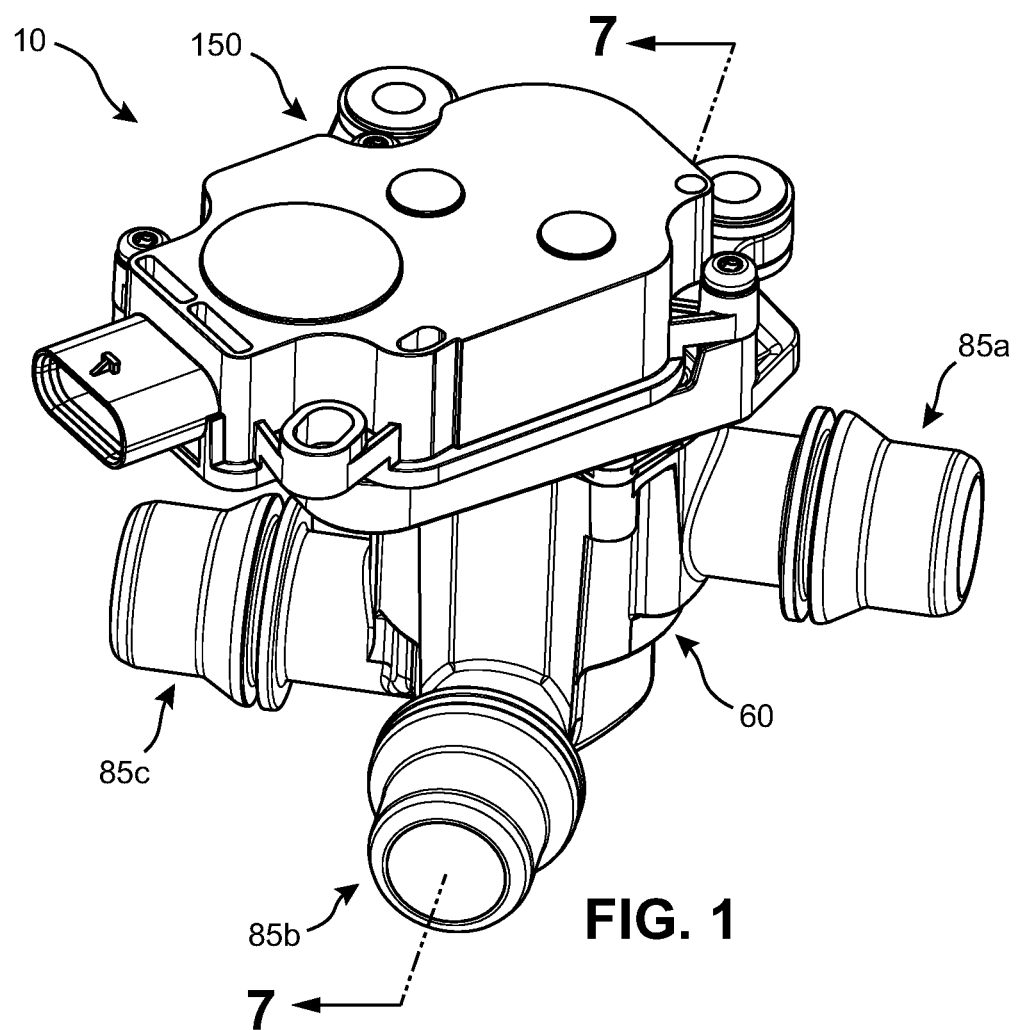
FIG. 1 is perspective view of a rotary disc valve according to an embodiment of the present invention.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-8 illustrate a rotary valve 10 according to an embodiment of the present invention. The illustrated rotary valve 10 may alternatively be referred to as a "diverter valve," as desired. The rotary valve 10 as shown and described herein may also be utilized for any number of different applications and for selectively conveying any variety of different fluids therethrough. As one example, the rotary valve 10 may be a proportional diverter valve as utilized in distributing a flow of a liquid coolant of an automotive-based coolant fluid system between two or more downstream-arranged flow paths. However, it should be readily apparent that the presently disclosed rotary valve 10 may be utilized in substantially any automotive or vehicular application corresponding to the described flow configurations through the rotary valve 10, including the control of various fluids associated with operation of a hydraulic system, a pneumatic system, a fuel system, or a heating, ventilating, and air conditioning (HVAC) system of the associated vehicle, or the like. In addition to a liquid coolant, the fluids suitable for use with the rotary valve 10 may be air, any hydraulic fluids, any types of fuel, or any refrigerants typically utilized with respect to such vehicular systems, as desired. However, it should also be apparent that the present rotary valve 10 may be adapted for use with any fluid associated with any fluid conveying system without necessarily departing from the scope of the present invention, and is therefore not limited to automotive or vehicular applications.

The rotary valve 10 disclosed in FIGS. 1-8 generally includes a rotary disc valve assembly 20 (diverter assembly), a valve housing 60, and a rotary actuator 150. The disclosed rotary valve 10 includes a substantially cylindrical rotary disc valve assembly 20 and a substantially cylindrical valve housing 60. The rotary disc valve assembly 20 includes a fixed disc 22, a rotary disc 40, a drive shaft 110, and a biasing element 130. The fixed disc 22 is configured to maintain a substantially fixed position relative to the valve housing 60 during operation of the rotary valve 10. The rotary actuator 150 is configured to selectively rotate the drive shaft 110 and the rotary disc 40 relative to the valve housing 60 and the fixed disc 22 when changing a mode of operation of the rotary valve 10, wherein such different modes of operation correspond to different flow configurations and/or flow distributions of the corresponding fluid through the rotary valve 10 when flowing from an inlet to one of the plurality of outlets thereof.

The rotary disc valve assembly 20 includes the drive shaft 110 having a clearance in at least one direction relative to each of the rotary disc 40 and the fixed disc 22 to promote a self-leveling of the rotary disc 40 relative to the fixed disc 22, wherein such self-leveling promotes a desired seal between the facing surfaces of the engaging discs 22, 40. The biasing element 130 applies an axial force to the rotary disc 40 towards the fixed disc 22 to ensure a suitable seal is formed at the engagement therebetween while also ensuring that the rotary disc 40 is pressed towards the fixed disc 22 for promoting the described self-leveling effect when a misalignment occurs between the rotary disc 40 and the drive shaft 110. Each of these features is described in greater detail hereinafter when describing the structure and method of operation of the rotary valve 10.

The valve housing 60 extends axially from a first end 61 to a second end 62 thereof. The first end 61 of the valve housing 60 includes a cover 63. The cover 63 includes an opening 64 configured to receive an actuator engagement stem 118 of the drive shaft 110 therethrough. In the present embodiment, a rim 65 of the valve housing 60 formed at the first end 61 thereof is engaged with and aggressively joined to an inner axial surface of the cover 63 to form a fluid-tight seal therebetween. The aggressive joining of the cover 63 and the rim 65 of the valve housing 60 may include a welding operation, such as a laser welding operation, as desired. In other embodiments, the cover 63 may be removably coupled to the rim 65 of the valve housing 60 with an intervening sealing element (not shown) compressed therebetween, such as by utilizing a threaded fastener for urging the cover 63 towards the rim 65 of the valve housing 60. Any configuration of the cover 63 relative to the valve housing 60 that provides a fluid-tight seal may be utilized without departing from the scope of the present invention.

A pair of O-rings or other gaskets 66 may be received between an inner circumferential surface of the cover 63 defining the opening 64 thereof and an outer circumferential surface of the actuator engagement stem 118 of the drive shaft 110 to form a fluid-tight seal therebetween, including during periods of rotation of the drive shaft 110 relative to the valve housing 60. A chamber having the gaskets 66 disposed therein may be partially defined by a shoulder of the cover 63 formed along the opening 64 thereof at a first axial end of the chamber and an annular spacer 114 disposed radially between the actuator engagement stem 118 and the inner circumferential surface of the cover 63 at a second axial end of the chamber. However, alternative sealing arrangements may be present between the drive shaft 110 and the valve housing 60 while remaining within the scope of the present invention, hence the described configuration is not limiting to the present invention.

The valve housing 60 further defines a substantially cylindrical opening 67 formed therein with the opening 67 extending from an inner facing surface of the cover 63 at the first end 61 of the valve housing 60 to an axial end wall 68 formed at the second end 62 thereof. A circumferential wall 69 of the valve housing 60 extends axially to connect the cover 63 to the axial end wall 68, and may be substantially cylindrical in shape. The axial end wall 68 is configured to sealingly engage the rotary disc valve assembly 20 and the circumferential wall 69 is configured to surround the rotary disc valve assembly 20 when the rotary disc valve assembly 20 is disposed within the opening 67 of the valve housing 60.

The circumferential wall 69 of the valve housing 60 includes an inner circumferential surface 70 extending peripherally around the rotary disc valve assembly 20. The inner circumferential surface 70 may include a pocket 71 where the inner circumferential surface 70 is indented radially outwardly to cause the opening 67 to include a greater radius along a circumferentially extending segment of the inner circumferential surface 70 relative to an axis of rotation of the drive shaft 110. The pocket 71 may extend axially from a first axial end at or adjacent the first end 61 of the valve housing 60 to a second axial end at or adjacent an exposed face of the rotary disc 40 of the rotary disc valve assembly 20, hence the pocket 71 is in direct fluid communication with a portion of the opening 67 to a first side of the rotary disc 40 with respect to the axial direction of the rotary disc valve assembly 20.

The valve housing 60 includes a plurality of housing ports 81, 82, 83 formed therein for communicating a fluid to or from the opening 67 of the rotary valve 10. More specifically, each housing port 81, 82, 83 is defined as a flow opening formed at the inner surface of the valve housing 60 forming an inlet into or outlet out of the opening 67 into which the rotary disc valve assembly 20 is received. Each of the housing ports 81, 82, 83 accordingly provides a flow boundary through which a fluid can flow to or from the rotary disc valve assembly 20, depending on a selected mode of operation of the rotary valve 10, as determined by a rotational position of the rotary disc 40 relative to the fixed disc 22. Each housing port 81, 82, 83 may be considered to represent a flow boundary between a flow space disposed exterior to the opening 67 and a flow space disposed within the opening 67 to either of a first side or an opposing second side of the rotary disc 40.

In the present embodiment, the housing ports 81, 82, 83 include an inlet housing port 81 formed to the first side of the rotary disc 40 with respect to the axial direction of the rotary valve 10, a first outlet housing port 82 formed to the second side of the rotary disc 40 with respect to the axial direction of the rotary valve 10, and a second outlet housing port 83 also formed to the second side of the rotary disc 40 with respect to the axial direction of the rotary valve 10. The rotary valve 10 is accordingly configured to distribute the fluid entering the opening 67 via the inlet housing port 81 to one or both (or none) of the outlet housing ports 82, 83, as determined by a rotational position of the rotary disc 40 relative to the fixed disc 22 for allowing passage of the fluid between the opposing first and second sides of the rotary disc 40 (via passage through the fixed disc 22).

The inlet housing port 81 is formed at the inner circumferential surface 70 of the valve housing 60 as a radially inwardly disposed terminal end of a corresponding fluid conduit 85*a* of the valve housing 60. In the present embodiment, the inlet housing port 81 is formed along the radially outwardly extended pocket 71, but the inlet housing port 81 may alternatively be formed within any portion of the inner circumferential surface 70, including a cylindrically contoured portion thereof. The inlet housing port 81 is arranged such that flow through the inlet housing port 81 and into the opening 67 includes the fluid flowing in a radial direction of the rotary valve 10 arranged perpendicular to the axis of rotation of the drive shaft 110.

In contrast, each of the outlet housing ports 82, 83 is formed at an inner axial end surface 72 of the axial end wall 68 disposed at the second end 62 of the valve housing 60. The first outlet housing port 82 is formed along the inner axial end surface 72 and through the axial end wall 68 at a first position disposed between the axis of rotation of the drive shaft 110 and a first circumferentially extending segment of the inner circumferential surface 70 of the valve housing 60. The second outlet housing port 83 is formed along the inner axial end surface 72 and through the axial end wall 68 at a second position disposed between the axis of rotation of the drive shaft 110 and a second circumferentially extending segment of the inner circumferential surface 70 of the valve housing 60 disposed adjacent the first circumferentially extending segment thereof. In the present embodiment, each of the outlet housing ports 82, 83 includes a perimeter shape resembling a sector of a circle, and each of the outlet housing ports 82, 83 occupies about a third of the circular cross-sectional shape of the inner axial end surface 72. However, alternative configurations of the outlet housing ports 82, 83 may be utilized at the inner axial end surface 72 and through the axial end wall 68 for selectively communicating the fluid to a desired one or combination of the outlet housing ports 82, 83, so long as the outlet housing ports 82, 83 are positioned for receiving a desired distribution of the fluid passing through the rotary valve 10 based on the instantaneous rotational position of the rotary disc 40 relative to the fixed disc 22 as explained hereinafter.

Each of the outlet housing ports 82, 83 is arranged such that flow through the corresponding outlet housing port 82, 83 includes the fluid flowing in the axial direction of the rotary valve 10, arranged parallel to the axis of rotation of the drive shaft 110, when exiting the opening 67 of the valve housing 60. In the present embodiment, each of the outlet housing ports 82, 83 is associated with a corresponding fluid conduit 85*b*, 85, respectively, for conveying the fluid from the corresponding one of the outlet housing ports 82, 83 to an adjacent component (not shown) of the corresponding fluid system. The fluid conduits 85*b*, 85*c* associated with the outlet housing ports 82, 83 are each shown as including a 90° turn where the fluid is redirected from flowing in the axial direction of the drive shaft 110 to flowing in the radial direction thereof, wherein the two different fluid conduits 85b, 85c associated with the outlet housing ports 82, 83 extend away from the valve housing 60 in perpendicular arranged radial directions.

However, it should be readily apparent to one skilled in the art that alternative configurations of the different fluid conduits 85a, 85b, 85c extending away from the valve housing 60 may be utilized for prescribing a desired flow configuration of the fluid when entering or exiting the associated housing ports 81, 82, 83 without necessarily altering the manner of operation of the rotary valve 10 as described herein, hence any such variations are within the scope of the present invention. For example, the fluid conduits 85b, 85c associated with the outlet housing ports 82, 83 may be purely axial in extension, or may include contrary or additional bends or curves, while still receiving the fluid from the rotary disc valve assembly 20 in the manner described herein. Such potential variations are described in greater detail when discussing an embodiment of the rotary valve 1010 suitable for removable installation into a corresponding vehicle component, module, or system 1200, as disclosed in FIGS. 9 and 10.

Each of the conduits 85a, 85b, 85c may form a fluid coupling, fitting, adapter, or the like for engaging an adjacent fluid conveying component, conduit, hose, pipe, or the like of the corresponding fluid system. However, the valve housing 60 may be provided devoid of the conduits 85a, 85b, 85c, so long as each of the housing ports 81, 82, 83 includes flow into or out of the opening 67 of the valve housing 60 according to the method of operation of the rotary valve 10 as described herein.

Referring now to FIGS. 3-6, which illustrate various stages of assembly of the rotary valve 10, the inner axial end surface 72 may be divided into a distal surface 73 spaced distally from the first end 61 of the valve housing 60, a seal seating surface 74 spaced axially from the distal surface 73 towards the first end 61 of the valve housing 60, and at least one chamfered surface 75 providing an inclined surface for connecting the seal seating surface 74 to either of the distal surface 73 or a surface of the valve housing 60 defining one of the boundaries corresponding to one of the outlet housing ports 82, 83. The seal seating surface 74 is accordingly spaced axially from each of the surfaces of the valve housing 60 defining one of the outlet housing ports 82, 83 to allow for the inclined connection of the described surfaces via one of the chamfered surfaces 75. The seal seating surface 74 is arranged substantially perpendicular to the axis of rotation of the drive shaft 110 and is planar in configuration. Each of the chamfered surfaces 75 is inclined with respect to the axis of rotation of the drive shaft 110, such as including about a 45° inclination with respect to the axis of rotation of the drive shaft 110. However, other inclinations may be utilized while remaining within the scope of the present invention, and may vary along the chamfered surfaces 75.

The seal seating surface 74 is configured to receive an arrangement of a sealant 76 thereon for establishing a fluid-tight seal between the seal seating surface 74 and the fixed disc 22 when the fixed disc 22 is installed within the opening 67 of the valve housing 60. The seal seating surface 74 is accordingly shaped to include a configuration wherein each of the outlet housing ports 82, 83 is surrounded by a corresponding portion of the seal seating surface 74 to allow for the formation of a fluid-tight seal around a perimeter of each of the outlet housing ports 82, 83 where the sealant 76 is present. In the present embodiment, the seal seating surface 74 includes a first perimeter segment 74a extending around a perimeter of the first outlet housing port 82, a second perimeter segment 74b extending around a perimeter of the second outlet housing port 83, and a support segment 74c extending away from the perimeter segments 74a, 74b for supporting the fixed disc 22 opposite the perimeter segments 74a, 74b to maintain a perpendicular arrangement of the fixed disc 22 relative to the axis of rotation of the drive shaft 110. In the present embodiment, all of the disclosed segments 74a, 74b, 74c are continuously formed with each other with one radially extending portion of the seal seating surface 74 corresponding to a portion of each of the adjacent perimeter segments 74a, 74b. The support segment 74c is also shown as extending arcuately between two other radially extending portions of the seal seating surface 74 along an arc having a constant radius of curvature relative to the axis of rotation of the drive shaft 110. However, it should be apparent that the seal seating surface 74 may include alternative configurations for supporting the fixed disc 22 while providing a fluid-tight seal around each of the outlet housing ports 82, 83 via application of the sealant 76 thereto, including the use of multiple spaced apart and distinct segments of the seal seating surface 74 each having the sealant 76 disposed thereon, as desired.

As shown throughout FIGS. 3 and 4, each of the chamfered surfaces 75 is shaped to correspond to the shape of a corresponding edge of the seal seating surface 74 such that the axial end surface 72 begins to extend axially away from the plane defined by the seal seating surface 74 when extending away from the corresponding edge of the seal seating surface 74. The arrangement of the sealant 76 is disposed along the seal seating surface 74 and accordingly includes the same configuration as that described with regards to the seal seating surface 74. The sealant 76 may be applied as a bead of the sealant 76 extending to surround each of the outlet housing ports 82, 83, respectively. FIG. 4 illustrates a cross-sectional view taken through the valve housing 60 at a position corresponding to a base of the bead of the sealant 76 where the sealant 76 contacts the seal seating surface 74, hence FIG. 4 illustrates a perimeter shape of the arrangement of the sealant 76 when applied to the seal seating surface 74. The bead of the sealant may be applied to include a substantially semi-circular cross-sectional shape relative to the plane of the seal seating surface 74, although alternative configurations or cross-sectional shapes may be utilized while remaining within the scope of the present invention.

The chamfered surfaces 75 are provided at each of the edge boundaries of the seal seating surface 74 to allow for the sealant 76 to expand laterally beyond the corresponding edge boundary while flowing into an axially expanding space as formed between the surface of the fixed disc 22 engaging the seal seating surface 74 and each of the inclined chamfered surfaces 75. This expansion of the sealant 76 into such spaces formed by the chamfered surfaces 75 may occur when the fixed disc 22 is first installed into the opening 67 and compressed against the sealant 76 when the sealant is uncured and substantially flowable. Following such expansion, the sealant 76 may be allowed to cure with the resulting sealant structure maintaining the axially expanded shape about each of the outlet housing ports 82, 83, thereby improving the robustness of the fluid-tight seal about a perimeter of each of the outlet housing ports 82, 83.

As best shown in FIGS. 3-5, the inner axial end surface 72 of the valve housing 60 further includes a locating structure 78 extending axially therefrom for establishing the fixed position of the fixed disc 22 relative to the valve housing 60, and more specifically for providing a structural feature that is not axially symmetric relative to the axis of rotation of the drive shaft 110 such that the fixed disc 22 cannot undesirably rotate relative to the valve housing 60 about a central axis of the fixed disc 22 substantially aligned axially with the axis of rotation of the drive shaft 110. The locating structure 78 also extends radially inwardly from the otherwise cylindrical shape of the inner circumferential surface 70 at a position where the inner circumferential surface 70 meets the inner axial end surface 72. The locating structure 78 may be formed within the third of the circular cross-sectional shape of the opening 67 devoid of one of the outlet housing ports 82, 83. The locating structure 78 includes a shoulder 79 where an axially extending surface of the locating structure 78 meets a radially extending surface thereof, and the shoulder 79 extends arcuately and convexly between two different circumferential positions along the inner circumferential surface 70. The shoulder 79 is spaced axially from the distal surface 73 a greater distance than the seal seating surface 74 to cause the shoulder 79 to have an axial position corresponding to that of the fixed disc 22 when the fixed disc 22 is seated on the sealant 76 disposed on the seal seating surface 74. The shoulder 79 is also spaced axially from the rotary disc 40 to prevent interference therewith during rotation thereof.

Figure 2:
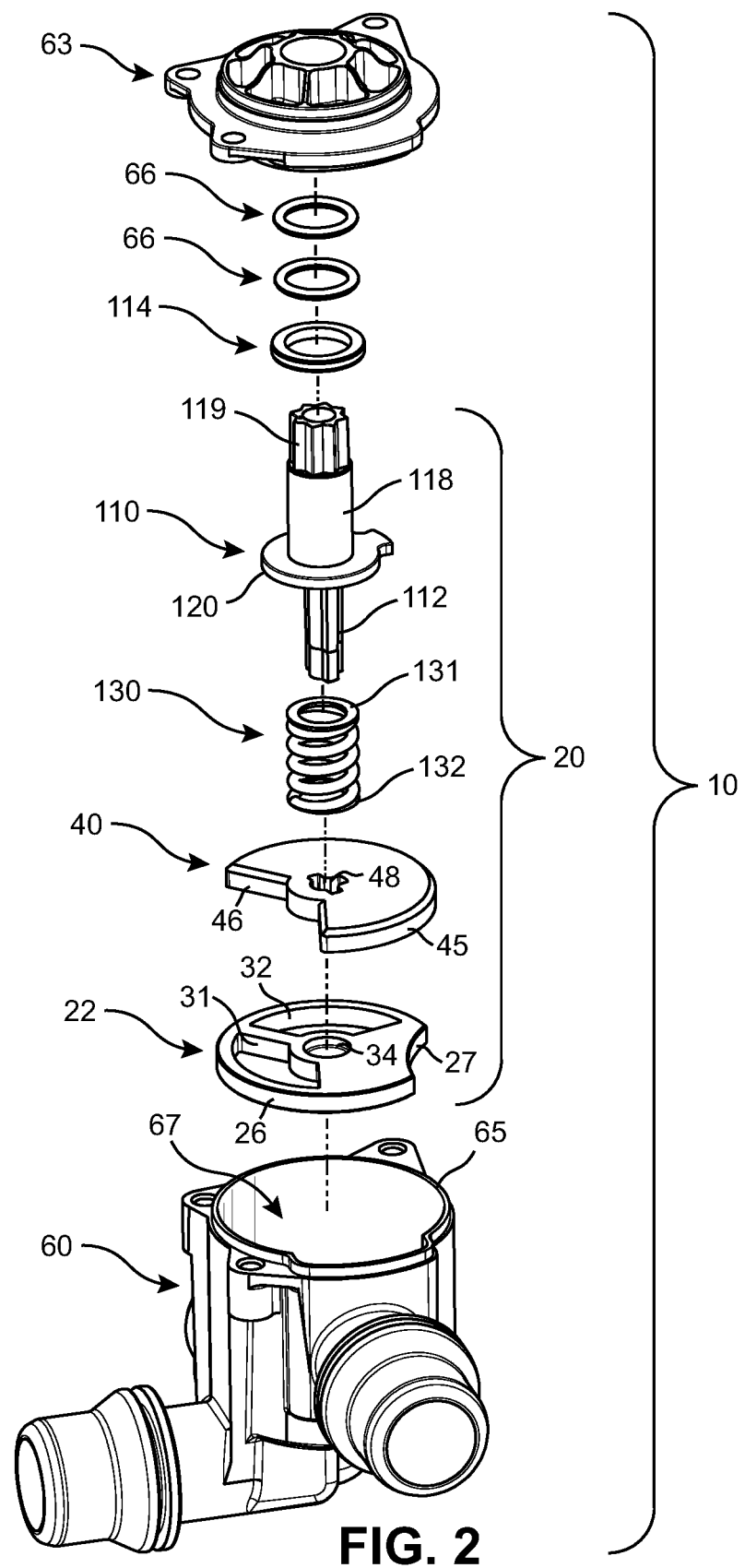
FIG. 2 is an exploded perspective view of the rotary disc valve of FIG. 1 in the absence of a rotary actuator thereof.

The fixed disc 22 is substantially cylindrical in shape and includes a first face 23, an opposing second face 24, and an outer circumferential surface 25 connecting the first face 23 to the second face 24 with respect to the axial direction of the drive shaft 110. As best shown in FIG. 2, the outer circumferential surface 25 is divided into a cylindrical segment 26 having a shape and size corresponding to a cylindrically shaped portion of the inner circumferential surface 70 of the circumferential wall 69 and a locating segment 27 having a shape and size corresponding to the locating structure 78 of the valve housing 60. The locating segment 27 is provided as a radially inwardly extending indentation formed in the circumferential surface 25 having the same configuration as the shoulder 79 of the locating structure 78.

The first face 23, which may alternatively be referred to as the first axial end surface 23 of the fixed disc 22, is arranged to face outwardly towards the first end 61 of the valve housing 60, whereas the second face 24, which may alternatively be referred to as the second axial end surface 24 of the fixed disc 22, is arranged to face outwardly towards the second end 62 of the valve housing 60. The first face 23 and the second face 24 are arranged parallel to each other, and each face 23, 24 is planar in configuration. The plane of each face 23, 24 is arranged to be substantially perpendicular to the axis of rotation of the drive shaft 110. The first face 23 is configured to face towards and engage a face of the rotary disc 40 while the second face 24 is configured to face towards and sealingly engage the sealant 76 disposed on the inner axial end surface 72 of the valve housing 60. The outer circumferential surface 25 of the fixed disc 22 is fitted to the inner circumferential surface 70 of the valve housing 60 with the cylindrical segment 26 axially aligned with a corresponding cylindrical portion of the inner circumferential surface 70 and the locating segment 27 axially aligned with the locating structure 78. The reception of the fixed disc 22 into the opening 67 includes the shoulder 79 of the locating structure 78 disposed at an axial position between the opposing faces 23, 24 of the fixed disc 22.

The fixed disc 22 further includes a first flow opening 31 and a second flow opening 32 formed therethrough from the first face 23 to the second face 24 thereof. Each of the flow openings 31, 32 accordingly provides fluid communication between the first face 23 and the second face 24 of the fixed disc 22. The first flow opening 31 is axially aligned with the first outlet housing port 82 and the second flow opening 32 is axially aligned with the second outlet housing port 83. The first flow opening 31 accordingly provides fluid communication between the inlet housing port 81 and the first outlet housing port 82 when the rotary disc valve assembly 20 is adjusted to a corresponding configuration, and the second flow opening 32 provides fluid communication between the inlet housing port 81 and the second outlet housing port 83 when the rotary disc valve assembly 20 is adjusted to a corresponding configuration.

The first flow opening 31 includes a peripheral shape that substantially corresponds to and is axially aligned with that of the first outlet housing port 82, while the second flow opening 32 includes a peripheral shape that substantially corresponds to and is axially aligned with that of the second outlet housing port 83. In the present embodiment, each of the flow openings 31, 32 includes a perimeter shape resembling a truncated sector of a circle, wherein a radial inner portion of the perimeter is truncated in an arcuate shape having a constant radius of curvature relative to the axis of rotation of the drive shaft 110. In the present embodiment, each of the flow openings 31, 32 occupies about a third of the circular cross-sectional shape of the fixed disc 22, but alternative configurations of the flow openings 31, 32 may be utilized through the fixed disc 22 for selectively communicating the fluid to a desired one or combination of the outlet housing ports 82, 83.

The fixed disc 22 also includes a shaft receiving indentation 34 formed in the first face 23 thereof and extending towards the second face 24 thereof. The shaft receiving indentation 34 is cylindrical in shape and includes a depth with respect to the axial direction of the drive shaft 110 sufficient to provide an axial clearance between a base surface 35 of the shaft receiving indentation 34 and a distal end 115 of the drive shaft 110. The cylindrical shape of the shaft receiving indentation 34 may be centered relative to the axis of rotation of the drive shaft 110. An inner circumferential surface 36 connects the base surface 35 to the first face 23 thereof and may be substantially cylindrical in shape. The inner circumferential surface 36 is shaped and sized to be spaced radially from a disc engagement stem 112 of the drive shaft 110 to form a radially extending clearance between the drive shaft 110 and the fixed disc 22 around an entirety of the circumference of each of an outer circumferential surface 117 of the disc engagement stem 112 and the inner circumferential surface 36. The drive shaft 110, and more specifically the disc engagement stem 112 thereof, is accordingly never placed in contact with the fixed disc 22 during operation of the rotary valve 10 due to the presence of the axial clearance and the radial clearance present between the distal end 115 of the drive shaft 110 and the surfaces 35, 36 defining the shaft receiving indentation 34 within the fixed disc 22. The distal end 115 of the drive shaft 110 may accordingly be said to float relative to the fixed disc 22 due to the lack of engagement therebetween.

The rotary disc 40 is substantially cylindrical in shape and includes a first face 41, an opposing second face 42, and an outer circumferential surface 44 connecting the opposing faces 41, 42 with respect to the axial direction of the drive shaft 110. As best shown in FIG. 2, the outer circumferential surface 44 is divided into a cylindrical segment 45 having a shape and size corresponding to a cylindrically shaped portion of the inner circumferential surface 70 of the circumferential wall 69 and a flow passage segment 46 having a shape and size substantially corresponding to either one of the flow openings 31, 32 formed through the fixed disc 22. Specifically, the flow passage segment 46 is provided as a radially inwardly indented portion of the outer circumferential surface 44 forming a flow passage 47 through the rotary disc 40.

The flow passage 47 of the presently disclosed embodiment is defined by an open space formed between the inner circumferential surface 70 of the valve housing 60 and the flow passage segment 46 of the outer circumferential surface 44, which results in the flow passage 47 having the shape of a radially inwardly truncated sector of a circle in similar fashion to each of the flow openings 31, 32. However, it should be readily apparent that substantially any shape and configuration of the flow passage 47 may be provided through the rotary disc 40 so long as the resulting flow passage 47 is able to be selectively placed in fluid communication with a desired one or both of the flow openings 31, 32 formed through the fixed disc 22. For example, instead of including a radially inwardly extending indentation for forming the open space defining the flow passage 47, the flow passage 47 may instead be provided as a through-hole or opening passing from the first face 41 to the opposing second face 42 of the rotary disc 40, including having the same general shape and configuration of either of the disclosed flow openings 31, 32 of the fixed disc 22.

Figure 8:
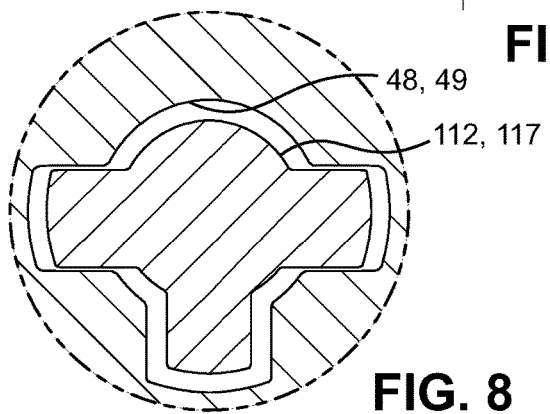
FIG. 8 is a fragmentary cross-sectional view taken through a portion of the valve housing where the rotary disc of the rotary disc valve receives a drive shaft of the rotary disc valve therethrough, wherein the cross-sectional view is taken from a perspective aligned axially with an axis of rotation of the drive shaft.

A shaft receiving opening 48 is formed through the rotary disc 40 at a position axially aligned with the drive shaft 110 to allow for passage of the drive shaft 110 through the rotary disc 40 from the first face 41 to the opposing second face 42 thereof. The shaft receiving opening 48 may include substantially any axially non-symmetric shape for transferring rotational motion from the disc engagement stem 112 of the drive shaft 110 to the rotary disc 40 via engagement between the outer circumferential surface 117 of the disc engagement stem 112 and an inner circumferential surface 49 of the rotary disc 40 defining the shaft receiving opening 48. As best shown in FIG. 8, the presently disclosed embodiment includes the shaft receiving opening 48 having a cross-sectional shape including a substantially cylindrical portion and three angularly displaced and radially outwardly projecting portions, wherein two of the radially outwardly projecting portions are oppositely arranged and the third of the radially outwardly projecting portions is offset 90° from the pair of the opposing radially outwardly projecting portions.

The fixed disc 22 and the rotary disc 40 may each be formed from a ceramic material having a relatively low co-efficient of friction and a correspondingly high resistance to wear when the discs 22, 40 are caused to move relative to each other when the opposing faces 23, 42 thereof are placed in contact with each other. The ceramic material may also include a relatively low coefficient of thermal expansion to prevent excessive deformation of either of the discs 22, 40 when exposed to varying temperatures, such as when the fluid passing through the rotary valve 10 varies in temperature. The ceramic material may also be selected such that the engaging faces 23, 42 can be precision-machined to be planar in configuration such that the facing engagement of the faces 23, 42 prevents the flow of a fluid therebetween. A fluid-tight seal may accordingly be formed directly between the engaging faces 23, 42 of the discs 22, 40 absent the intervention of any form of additional sealing element, O-ring, gasket, or the like therebetween as a result of the planar face-to-face engagement present between the faces 23, 42.

The discs 22, 40 may alternatively be formed from a first material that is coated at certain surfaces with a second material. The second material may be disposed at those surfaces configured to make sliding engagement with another surface, such as along the engaging faces 22, 43, or along the outer circumferential 44 surface of the rotary disc 40. The second material may be the ceramic material as described above. The second material may alternatively be a diamond material or a diamond-like carbon (DLC) material. The second material may alternatively be a lubricant, such as a water-insoluble lubricant. The faces 22, 43 and/or the outer circumferential surface 44 of the rotary disc 40 may include any combination of any of the materials and coatings as described herein while remaining within the scope of the present invention, so long as the facing engagement present between the outwardly exposed faces 23, 42 is utilized to provide a seal therebetween in the manner described herein in the absence of an intervening and independently provided sealing component or structure.

The drive shaft 110 includes a flanged portion 120 separating the disc engaging stem 112 from the actuator engaging stem 118. The flanged portion 120 includes a greater diameter than either of the stems 112, 118 and defines a biasing element engaging surface 121 facing towards and engaging the biasing element 130 and a cover engaging surface 122 facing towards and engaging an inner surface of the cover 63, wherein each of the engaging surfaces 121, 122 are radially extending with respect to the axis of rotation of the drive shaft 110. As shown schematically in FIG. 7, the actuator engagement stem 118 extends outside of the cover 63 for engagement with a corresponding structure of the rotary actuator 150 configured to selectively rotate the drive shaft 110 about the axis of rotation thereof. More specifically, the engagement stem 118 is shown as having an axially non-symmetric actuator engagement portion 119 having a shape configured to mate with a correspondingly shaped axially non-symmetric opening (not shown) of the rotary actuator 150 for transferring torque from the rotary actuator 150 to the drive shaft 110. However, it should be readily understood that any form of mechanical connection facilitating the selective rotation of the drive shaft 110 relative to the rotary actuator 150 may be utilized while remaining within the scope of the present invention. The rotary actuator 150 may be any form of rotary actuator 150 suitable for providing the torque necessary to cause the rotation of the rotary disc 40 relative to the fixed disc 22. The rotary actuator 150 may be a torque motor, a servo motor, an electric stepper motor, or a brushless DC motor, as non-limiting examples.

The rotary actuator 150 may be configured to control the rotational position of the rotary disc 40 relative to the fixed disc 22 absent the use of structural features forming hard stops for preventing further rotation of the drive shaft 110 or the rotary disc 40 in either of the possible rotational directions. That is, the rotary actuator 150 may be associated with a controller (not shown) utilizing an associated control scheme wherein the rotational position of the drive shaft 110, and hence the rotary disc 40, is controlled based on a known condition of the drive shaft 110 relative to the rotary actuator 150. For example, an encoder or sensor arrangement may be utilized to monitor all rotations of the drive shaft 110 as caused by the rotary actuator 150, thereby allowing for the controller to determine an instantaneous rotational position of the drive shaft 110 and rotary disc 40, as well as to determine an extent of rotation of the drive shaft 110 and the rotary disc 40 following a change in rotational positions thereof. Alternatively, a sensor arrangement may be utilized to calibrate the rotary actuator 150 such that the rotary disc 40 is placed at an initial desired rotational position from which monitored rotations of the drive shaft 110 may occur to place the drive shaft 110 and rotary disc 40 at desired rotational positions. Any suitable control scheme configured to place the drive shaft 110 and the rotary disc 40 at the rotational positions and resulting flow configurations described as possible hereinafter may be utilized while remaining within the scope of the present invention.

The biasing element 130 extends axially from a first end 131 engaging the biasing element engaging surface 121 of the drive shaft 110 adjacent the cover 63 to a second end 131 engaging the face 41 of the rotary disc 40. Each of the ends 131, 132 of the biasing element 130 may be substantially annular in shape with the annular shape centered substantially about an axis of rotation of the drive shaft 110. The biasing element 130 is shown as a helical spring, but any form of biasing element 130 providing the forces described hereinafter may be utilized while remaining within the scope of the present invention.

The biasing element 130 is configured to be normally compressed between the biasing element engaging surface 121 of the drive shaft 110 and the first face 41 of the rotary disc 40 such that the biasing element 130 normally applies an axial force to each of the flanged portion 120 of the drive shaft 110 in a direction towards the cover 63 and the first face 41 of the rotary disc 40 in a direction towards the fixed disc 22. The biasing element 130 accordingly applies an axial force to the rotary disc 40 against the fixed disc 22 to establish the described fluid-tight seal via the co-planar arrangement of the faces 23, 42 relative to one another. The biasing element 130 also applies an axial force to the drive shaft 110 against the cover 63 to maintain the floating configuration of the distal end 115 of the drive shaft 110 relative to the fixed disc 22, thereby avoiding a constraining of the drive shaft 110 at the distal end 115 thereof. The biasing element 130 may be selected to provide the axial force, which may be referred to as the biasing force of the biasing element 130, to be such that the torque of the rotary actuator 150 can overcome any frictional forces present between the engaging faces 23, 42 as facilitated by the presence of the biasing force. The biasing force 130 may also be selected to be great enough to prevent a disengagement of the faces 23, 42 from one another as a result of the formation of a back-pressure of the fluid where the fluid encounters the second face 42 of the rotary disc 40 with respect to certain rotational positions thereof. For example, the biasing force 130 may be selected to resist 1.0 Bar of back-pressure, as one non-limiting example. It is also conceivable that the biasing force 130 may be selected to ensure disengagement and back-flow of the fluid when certain back-pressures are experienced at the second face 42 of the rotary disc 40, as necessary.

Again referring to FIG. 8, the outer circumferential surface 117 of the disc engagement stem 112 includes a cross-sectional shape substantially corresponding to that of the inner circumferential surface 49 of rotary disc 40, but reduced in size relative thereto to provide a clearance between the inner circumferential surface 49 and the outer circumferential surface 117 with respect to a plurality of axes arranged perpendicular to the axis of rotation of the drive shaft 110. Specifically, the outer circumferential surface 117 includes a cylindrical shape having three radially outwardly projecting portions having an axially non-symmetric shape in similar fashion to the inner circumferential surface 49, but with the corresponding features of the outer circumferential surface 117 having reduced dimensions in comparison to those features of the inner circumferential surface 49. The surfaces 49, 117 may be shaped and dimensioned such that the surfaces 49, 117 are capable of being spaced apart from each other (and not in contact) around an entirety of a perimeter of each of the surfaces 49, 117 with respect to at least one position and orientation of the drive shaft 110 relative to the rotary disc 40, which includes the relative positioning shown in FIG. 8 where an axis of rotation of the drive shaft 110 and an axis of rotation of the rotary shaft 40 are aligned with one another. Such a positioning as illustrated in FIG. 8 also includes the presence of the clearance with respect to all radial directions extending from the axis of rotation of the drive shaft 110. However, it should also be understood that this clearance is not maintained at all times about the entirety of the perimeter of each such surface 49, 117, such as when the surfaces 49, 117 must engage each other in order to transfer rotational motion from the drive shaft 110 to the rotary disc 40 during an adjustment of the rotary valve 10.

The clearance provided between the surfaces 49, 117 beneficially allows an axis of rotation of the rotary disc 40 to vary slightly from that of the drive shaft 110 while maintaining the fluid-tight seal present between the engaging faces 23, 42 of the discs 22, 40. As mentioned above, the presence of the fluid-tight seal between the engaging faces 23, 42 relies upon the co-planar arrangement of such faces 23, 42 to prevent the passage of a fluid therebetween. Any pitching or tilting of the rotary disc 40 relative to the fixed disc 22, or vice versa, could accordingly result in the failure of the seal present therebetween because such pitching or tilting implies the presence of a widening gap between such faces 23, 42. It is accordingly necessary to maintain the co-planar relationship present between the faces 23, 42 to ensure that a fluid-tight seal is maintained therebetween, and especially during periods of rotation of the rotary disc 40 relative to the fixed disc 22.

The clearance present between the surfaces 49, 117 aids in maintaining this co-planar arrangement by allowing for such misalignment or relative tilting between these different axes of rotation while allowing the biasing element 130 to maintain a force against the first face 41 of the rotary disc 40 that is primarily normal relative to the second face 42 thereof, and acting towards the first face 23 of the fixed disc 22. That is, any minor misalignment present between the axes of the drive shaft 110 and the rotary disc 40 can be easily accommodated by the flexible nature of the biasing element 130 for maintaining a force normal to the faces 41, 42 of the rotary disc 40, and any reduction of such force via a misalignment of an axial direction of the biasing element 130 relative to the axial direction of the rotary disc 40 is negligible with respect to maintaining the necessary force for establishing the fluid-tight seal between the engaging faces 23, 42.

Ideally, the axis of rotation of the drive shaft 110 is axially aligned with the axis of rotation of the rotary disc 40, and the engaging faces 23, 42 of the discs 22, 40 are arranged perpendicular to the common axis of rotation of the drive shaft 110 and the rotary disc 40. The described misalignment potentially occurring between the axis of rotation of the drive shaft 110 and the axis of rotation of rotary disc 40 may be expected to occur for any number of reasons during assembly of the rotary valve 10 or during operation thereof. As one example, any undesired variation in the application of the sealant 76 or the resulting sealing structure formed by the cured sealant may result in an axial direction of the fixed disc 22 being misaligned such that the second face 23 of the fixed disc 22 is arranged on a plane that is tilted or pitched relative to a plane arranged perpendicular to the axis of rotation of the drive shaft 110. As another example, any large variation in the thermal expansion of certain regions or features of the valve housing 60 or the rotary disc valve assembly 20 may lead to such features thermally deforming to present such minor misalignments. As yet another example, the assembly of the cover 63 to the rim 65 of the valve housing 60 may present another possible misalignment of the relevant axes, as may any misalignment of the drive shaft 110 relative to the cover 63 following passage therethrough. It is also possible that in some circumstances one or both of the discs 22, 40 may become misaligned relative to each other as a result of wear of the engaging faces 23, 42, such as when such wear occurs on a plane tilted relative to the plane arranged perpendicular to the axis of rotation of the drive shaft 110. Any such misalignments may be introduced via acceptable variations present within any of the manufacturing processes utilized in forming any of the described components, including wherein such components are formed within desired tolerances.

Figure 7:
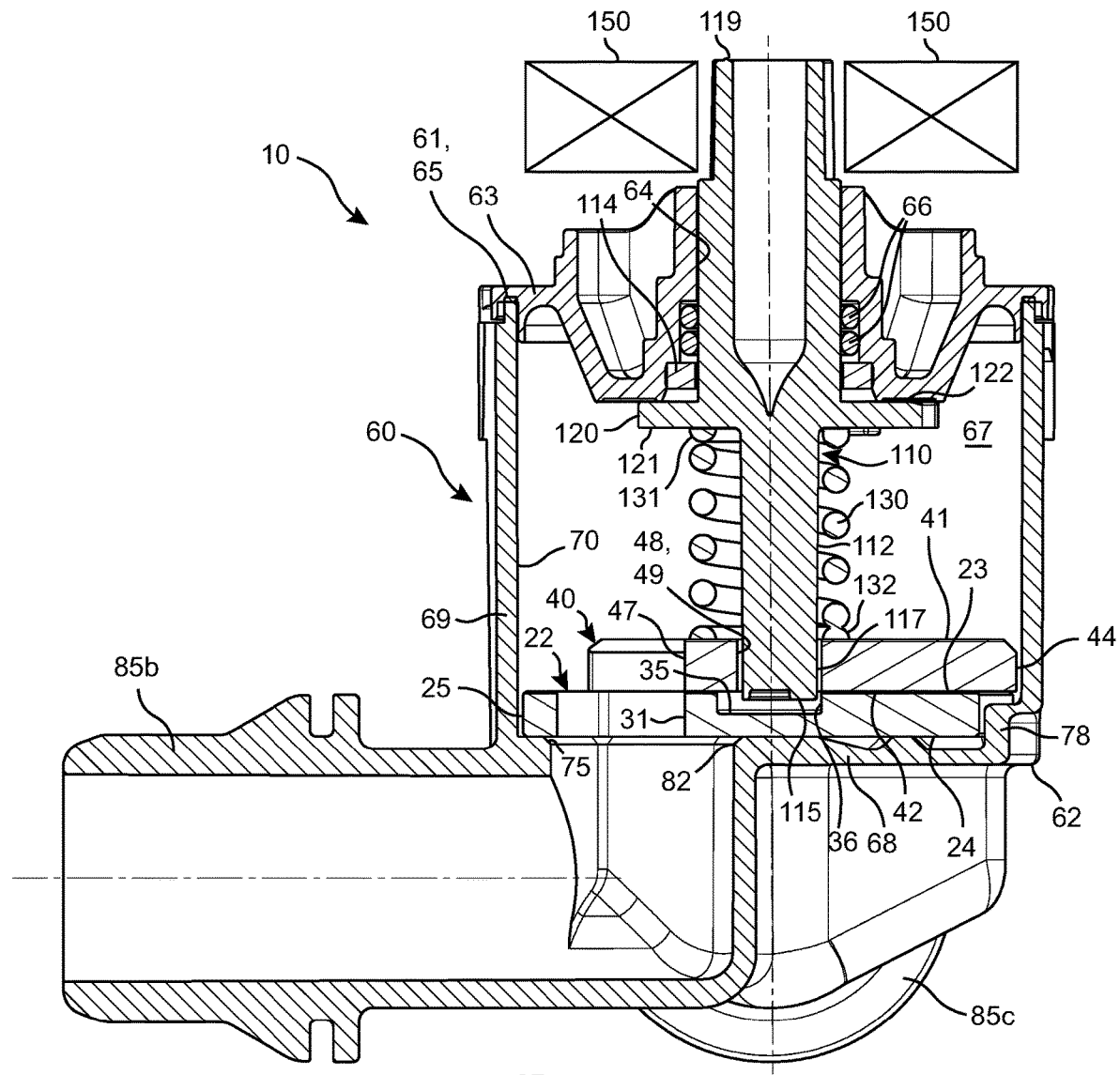
FIG. 7 is a cross-sectional elevational view of the rotary disc valve as taken from the perspective of section lines 7-7 in FIG. 1, wherein a rotary actuator of the rotary disc valve is shown in schematic form.

As shown in FIG. 7, a slight clearance may also be present between the inner circumferential surface 70 of the circumferential wall 69 and each of the outer circumferential surface 25 of the fixed disc 22 and the outer circumferential surface 44 of the rotary disc 40. This clearance may be present to accommodate the tilting or pitching of either of the discs 22, 40 in a manner wherein the discs 22, 40 cannot undesirably engage with the inner circumferential surface 70 of the valve housing 60, and especially during rotation of the rotary disc 40 relative to the fixed disc 22. These clearances may accordingly act in similar fashion to that described as being present between the surfaces 49, 117 for accommodating variations in the inclination of either of the discs 22, 40.

It should be readily apparent that the degree of misalignment (relative inclination) capable of occurring between the rotary disc 40 and the drive shaft 110 while maintaining operation of the rotary valve 10 is determined by the dimensions and configuration of the clearance present between the facing surfaces 49, 117. Specifically, the tilting or pitching of the rotary disc 40 relative to the axis of rotation of the drive shaft 110 may occur about an axis arranged perpendicular to the axis of rotation of the drive shaft 110, and the degree of tilting or pitching that can be accommodated by the clearance may be determined by the length of the clearance present in a direction perpendicular to the axis about which the tilting or pitching is occurring in combination with the axial length of extension of the clearance between the surfaces 49, 117. For example, a shortening of the axial length of the clearance and/or an increase in the clearance distance along the corresponding axis typically facilitates a greater degree of tilting or pitching being possible between the drive shaft 110 and the rotary disc 40 while an increasing of the axial length of the clearance and/or a decrease in the clearance distance along the corresponding axis typically facilitates a lower degree of tilting or pitching being possible between the drive shaft 110 and the rotary disc 40.

It should be readily apparent to one skilled in the art that the shapes utilized in illustrating each of the surfaces 49, 117 may also be replaced with any similarly complimentary axially non-symmetric surfaces having the general characteristics described herein. Specifically, in summary, the assembly of the drive shaft 110 and the rotary disc 40 may include the drive shaft 110 having a first axially non-symmetric surface and the rotary disc 40 having a second axially non-symmetric surface configured to receive the drive shaft 110 therein, wherein a clearance in present between the first and second axially non-symmetric surfaces in a manner facilitating a tilting or pitching of the rotary disc 40 relative to the drive shaft 110. The reception of the drive shaft 110 within the rotary disc 40 also includes the first axially non-symmetric surface configured to rotationally interfere with the second axially non-symmetric surface in a manner facilitating a transfer of rotational motion from the drive shaft 110 to the rotary disc 40, even in circumstances where the axes of rotation of the drive shaft 110 and the rotary disc 40 are misaligned and inclined relative to one another. The configuration of the clearance utilized in the rotary valve 10 accordingly establishes a maximum angle of inclination of misalignment possible between the axes of rotation of the drive shaft 110 and the rotary disc 40 while maintaining the normal operation of the rotary valve 10. As non-limiting examples, the clearance present between the drive shaft 110 and the rotary disc 40 may be selected to allow for a relative inclination therebetween of 1° or less, of 2° or less, of 3° or less, of 5° or less, or of 10° or less, as desired.

The rotary valve 10 generally operates as follows. The rotary actuator 150 is configured to control the rotational position of the drive shaft 110 relative to the valve housing 60 and the cover 63 via an appropriate transfer of torque from the rotary actuator 150 to the actuator engagement stem 118 of the drive shaft 110. The drive shaft 110 rotates in a desired rotational direction as a result of the transfer of the torque thereto, and the rotation of the drive shaft 110 results in a further transfer of torque from the drive shaft 110 to the rotary disc 40 as a result of the axially non-symmetric rotational interference provided by the interference of the engaging portions of the surfaces 49, 117.

A control scheme of the rotary valve 10, as prescribed by an associated controller, may include the drive shaft 110 and the rotary disc 40 being rotated to any of a plurality of different rotational positions corresponding to any of a variety of different flow configurations of the fluid through the rotary valve 10, as desired. Each of the different flow configurations may include the associated fluid, which may be a liquid coolant of a coolant system, originating from the inlet housing port 81 and flowing towards the rotary disc valve assembly 20 through the opening 67 formed in the valve housing 60. According to a possible first rotational position of the drive shaft 110 and the rotary disc 40, the flow passage 47 formed through the rotary disc 40 is axially aligned with the first flow opening 31 of the fixed disc 22, thereby causing the fluid to flow from the inlet housing port 81, through the flow passage 47, through the first flow opening 31, and then through the first outlet housing port 82 before exiting the rotary valve 10. According to a possible second rotational position of the drive shaft 110 and the rotary disc 30, the flow passage 47 is axially aligned with the second flow opening 32 to cause the fluid to flow from the inlet housing port 81, through the flow passage 47, through the second flow opening 32, and then through the second outlet housing port 83 before exiting the rotary valve 10. According to a possible third rotational position of the drive shaft 110 and the rotary disc 40, the flow passage 47 is at least partially axially aligned with each of the first flow opening 31 and the second flow opening 32, wherein a distribution of the fluid to each of the flow openings 31, 32 from the flow passage 47, and hence to each of the respective outlet housing ports 82, 83, is proportional to the extent of axial overlap present between the flow passage 47 and each of the respective flow openings 31, 32. The third rotational position may accordingly be representative of a plurality of different rotational positions intermediate the described first and second rotational positions. According to a possible fourth rotational position of the drive shaft 110 and the rotary disc 40, the flow passage 47 may be rotated to be out of axial alignment with each of the flow openings 31, 32 such that the second face 42 of the rotary disc 40 closes off each of the flow openings 31, 32 so that no fluid communication occurs between the inlet housing port 81 and either of the outlet housing ports 82, 83 via the rotary disc valve assembly 20. According to a plurality of possible fifth rotational positions of the drive shaft 110 and the rotary disc 40, the flow passage 47 may be partially axially aligned and overlapped with the first flow opening 31 and not the second flow opening 32, thereby variably altering a flow area into the first flow opening 31 and the first outlet housing port 82 while the second flow opening 32 and the second outlet housing port 83 remain closed off. According to a plurality of possible sixth rotational positions of the drive shaft 110 and the rotary disc 40, the flow passage 47 may be partially axially aligned and overlapped with the second flow opening 32 and not the first flow opening 31, thereby variably altering a flow area into the second flow opening 32 and the second outlet housing port 83 while the first flow opening 31 and the first outlet housing port 82 remain closed off. The rotary valve 10 may be configured to include a control scheme utilizing any combination of any of the rotational positions described hereinabove while remaining within the scope of the present invention.

The biasing force applied to the rotary disc 40 by the biasing element 130 maintains a sealing force present between the co-planar arranged faces 23, 42 of the engaging discs 22, 40 throughout the rotation of the rotary disc 40 to any of the described rotational positions. The clearance present between the outer circumferential surface 117 of the engagement stem 112 of the drive shaft 110 and the inner circumferential surface 49 of the rotary disc 40, as well as between the distal end 115 of the drive shaft 110 and the fixed disc 22, allows the axis of rotation of the rotary disc 40 to be misaligned from and inclined relative to the axis of rotation of the drive shaft 110 while maintaining the ability to transfer torque from the drive shaft 110 to the rotary disc 40. The second face 42 of the rotary disc 40 is configured to form a fluid-tight seal with the first face 23 of the fixed disc 22 wherever the faces 23, 42 maintain contact with one another, thereby preventing an undesired flow of the corresponding fluid between the engaging faces 23, 42 for undesired distribution to one or both of the outlet housing ports 82, 83. Either of the flow openings 31, 32 may be completely closed off when the faces 23, 42 engage each other about an entirety of the perimeter of the corresponding flow opening 31, 32 while the second face 42 of the rotary disc 40 is in alignment with the closed off one of the flow openings 31, 32.

The rotary valve 10 shown and described in FIGS. 1-8 includes the conduits 85a, 85b, 85c for connecting the rotary valve 10 to externally disposed fluid lines, conduits, pipes, or hoses of a corresponding fluid system, which can be routed in any configuration suitable for connection to the conduits 85a, 85b, 85c of the rotary valve 10. The rotary valve 10 as depicted in FIGS. 1-8 is accordingly suitable for use with any associated fluid system capable of accommodating the rotary valve 10 and making all necessary fluid connections for carrying out the flow configurations described herein.

The disclosed rotary valve 10 provides numerous advantageous features in comparison to the rotary valves of the prior art. First, the relatively low-friction contact established between the facing ceramic surfaces 23, 42 results in a much lower torque being required to rotate the drive shaft 110 in comparison to a rotary valve having contact present between radially compressed sealing elements, thereby allowing for a lower powered rotary actuator 150 having a reduced cost and packaging space to be utilized in driving the rotary valve 10. Second, the self-leveling feature provided by the rotary disc valve assembly 20 allows for the rotary valve 10 to be assembled in a manner wherein precise alignments of all relevant components are not required, nor is a precision manufacturing of the surfaces otherwise necessary for maintaining such precise relationships. The rotary valve 10 can accordingly be manufactured by alternative methods reducing a cost and time necessary for assembling the rotary valve 10. Third, the self-leveling feature ensures that the rotary valve 10 maintains operation thereof in circumstances wherein subsequent misalignments are introduced due to normal operation of the rotary valve 10, thereby extending a period of use of the rotary valve 10. Lastly, the period of use of the rotary valve 10 is further extended by the use of the engaging faces 23, 42, which tend to wear much less quickly than a comparable elastomeric seal exposed to such friction.

Although not pictured, it should be readily understood that the general configuration of the rotary valve 10 may be adapted for use with additional outlet housing ports and fluid conduits, such as including three downstream arranged outlet housing ports rather than two, while remaining within the scope of the present invention. Such variations may include the formation of additional or alternatively shaped openings through the valve housing 60, the fixed disc 22, and the rotary disc 40 for prescribing the desired flow configurations, but the same general operating principles still apply wherein a self-leveling of the engagement between the faces 23, 42 establishes a fluid-tight seal therebetween. Additionally, the flow through the rotary valve 10 is not limited to flowing from the inlet port 81 to one of the outlet ports 82, 83, but may potentially include any distribution of flow between any of the ports 81, 82, 83, as desired.

Turning now to FIGS. 9 and 10, a modified rotary disc valve 1010 suitable for removable installation into a housing structure 1200 is disclosed, which is referred to as the rotary valve 1010 hereinafter. The rotary valve 1010 may be referred to as a cartridge 1010 due to the manner in which the rotary valve 1010 is easily installed and removed from a corresponding opening 1202 formed in the housing structure 1200 while simultaneously forming the necessary fluid connections for establishing any of the flow configurations through the rotary valve 1010 as established with respect to the description of the rotary valve 10. Specifically, the rotary valve 1010 provided as the cartridge 1010 includes the rotary disc valve assembly 20 as disclosed with reference to the rotary valve 10, hence all flow configurations through the rotary valve 10 are also achievable via the rotary valve 1010. The rotary valve 1010 differs from the rotary valve 10 only in the manner of installing the rotary valve 1010 relative to the remainder of the corresponding fluid system such as is provided by the housing structure 1200. Description of the rotary valve 1010 is accordingly limited hereinafter to those distinctions present between the rotary valve 10 and the rotary valve 1010.

The rotary valve 1010 includes a valve housing 1060 having an axial end wall 1068 and a circumferential wall 1069. A cover 1063 is coupled to the valve housing 1060 at a rim 1065 of the circumferential wall 1069 to enclose an opening 1067 of the valve housing 1060 having the operable components of the rotary valve 1010 disposed therein. The cover 1063 may be aggressively joined to the valve housing 1060 by a process such as laser welding.

A first fluid conduit 1085*a* extends outwardly from an outer circumferential surface 1090 of the circumferential wall 1069 in a direction perpendicular to the axial direction of the rotary valve 1010, wherein the axial direction of the rotary valve 1010 coincides with the direction of insertion of the rotary valve 1010 into the opening 1202. The first fluid conduit 1085*a* may extend in a radial direction of the rotary valve 1010, for example. The first fluid conduit 1085*a* is in direct fluid communication with a first inlet housing port 1081 of the valve housing 1060. A first gasket 1300 is arranged around an outer surface of the first fluid conduit 1085*a* such that the first gasket 1300 circumscribes a perimeter of the first fluid conduit 1085*a*. As shown in FIG. 9, the first gasket 1300 is configured to normally include a cross-sectional shape having a distal surface 1301 that is disposed axially beyond a distal end 1086*a* of the first fluid conduit 1085*a* when the first gasket 1300 is not in a state of compression. In the present embodiment, the first gasket 1300 includes a circular cross-sectional shape, but alternative cross-sectional shapes may be utilized while remaining within the scope of the present invention, so long as the cross-sectional shape of the first gasket 1300 facilitates a piloting of the first gasket 1300 into the opening 1202 when the first gasket 1300 encounters an edge of the opening 1202. For example, the circular cross-sectional shape is shown in FIG. 9 as being positioned to be inwardly compressed towards the outer circumferential surface 1090 as a result of an inclined portion of the circular cross-sectional shape encountering the edge of the opening 1202 in a manner facilitating the progressive compression of the first gasket 1300 as the first gasket 1300 is inserted into the opening 1202. Alternative shapes of the first gasket 1300 may include a tapered cross-sectional shape, such as a triangular shape, wherein the tapered end of the first gasket 1300 is disposed outwardly to engage the edge of the opening 1202 during axial insertion of the rotary valve 1010 therein.

A second fluid conduit 1085*b* extends from an outer axial end surface 1092 of the axial end wall 1068 in the axial direction of the rotary valve 1010 corresponding to the direction of insertion of the rotary valve 1010 into the opening 1202. The second fluid conduit 1085*b* is in direct fluid communication with a first outlet housing port 1082 of the valve housing 1060. A second gasket 1400 is arranged around an outer surface of the second fluid conduit 1085*b* such that the second gasket 1400 circumscribes a perimeter of the second fluid conduit 1085*b*. As shown in FIG. 9, the second gasket 1400 is configured to normally include a cross-sectional shape having a distal surface 1401 that is disposed axially beyond a distal end 1086*b* of the second fluid conduit 1085*b* when the second gasket 1400 is not in a state of compression. In the present embodiment, the second gasket 1400 includes a circular cross-sectional shape, but alternative cross-sectional shapes may be utilized while remaining within the scope of the present invention.

The rotary valve 1010 further includes an axially extending third fluid conduit (not shown) and third gasket (not shown) associated with a second outlet housing port (not shown), but these features are identical in structure and operation to the described second fluid conduit 1085*b*, second gasket 1400, and corresponding first outlet housing port 1082, hence further description is omitted herefrom. It should be understood that these features are offset laterally from those shown at a position not corresponding to the selected cross-sectional perspective, but otherwise include a similar appearance as the second fluid conduit 1085*b*, second gasket 1400, and first outlet housing port 1082.

The cover 1063 includes a flanged portion 1055 extending laterally therefrom for engagement with an outer face 1230 of the housing structure 1200 from which the opening 1202 formed therein is inwardly indented. The flanged portion 1055 contacting the outer face 1230 accordingly delimits an axial distance the rotary valve 1010 can be axially inserted into the opening 1202 formed in the housing structure 1200. The flanged portion 1055 further includes a plurality of fastener receiving holes 1056 formed therethrough with each of the fastener receiving holes 1056 configured to receive a threaded fastener 1057 therethrough for coupling the rotary valve 1010 to the housing structure 1200. The housing structure 1200 may accordingly include corresponding fastener receiving openings 1250 formed in the outer face 1230 thereof (only one of which is shown in FIGS. 9 and 10) that are configured for alignment with the fastener receiving holes 1056 of the flanged portion 1055 for threadably compressing the flanged portion 1055 in a direction towards the outer face 1230 of the housing structure 1200. However, the rotary valve 1010 may include alternative cooperating structures at the outer face 1230 of the housing structure 1200 for coupling the rotary valve 1010 thereto, including the use of snap-fit connectors, clips, or the like, as may be typical in the art.

The housing structure 1200 may refer to a fluid system module having a plurality of different components and/or fluid flow paths associated with any desired fluid system integrated therein. As one non-limiting example, the fluid system module may be a coolant system module including at least some of the components and/or fluid flow paths associated with a coolant system of the associated vehicle, such as a coolant system configured to cool an engine or a battery of the associated vehicle. The housing structure 1200 may include integrated flow paths, heat exchangers, electric coolant pumps, fluid reservoir tanks, fluid characteristic sensors, valve assemblies other than the rotary valve 1010, or the like, as one non-limiting example.

The housing structure 1200 includes an inner surface defining the opening 1202 thereof. The inner surface includes an inner circumferential surface 1204 arranged in the axial direction of the rotary valve 1010 (parallel to the axis of rotation of the drive shaft thereof) and an axial end surface 1206 arranged transverse to the axial direction of the rotary valve 1010, which is shown as being arranged perpendicular to the axial direction in FIGS. 9 and 10. Although not shown, the inner circumferential surface 1204 includes a perimeter shape at the outer face 1230 of the housing structure 1200 that substantially corresponds to a perimeter shape of the portion of the valve housing 1060 axially received within the opening 1202 in order to properly align the features of the valve housing 1060 with the corresponding features of the housing structure 1200.

A first flow path 1211 is formed through the housing structure 1200 with the first flow path 1211 intersecting the inner circumferential surface 1204. A second flow path 1212 is formed through the housing structure 1200 with the second flow path 1212 intersecting the axial end surface 1206. A third flow path (not shown) is also formed through the housing structure 1200 with the third flow path intersecting the axial end surface 1206 at a position distinct from the position the second flow path 1212 intersects the axial end surface 1206. The third flow path is positioned to be aligned axially with the non-illustrated second outlet housing port and third fluid conduit as surrounded by the third gasket. Each of the flow paths may represent any flow path forming a portion of the associated fluid system of the housing structure 1200.

As can be seen by comparison of FIGS. 9 and 10, the insertion of the rotary valve 1010 into the opening 1202 results in a compression of each of the gaskets 1300, 1400 in an axial direction of each corresponding fluid conduit 1085a, 1085b, respectively. Specifically, as shown in FIG. 9, a dimension of the rotary valve 10 as measured between the distal surface 1301 of the first gasket 1300 and a diametrically opposed portion of the outer circumferential surface 1090 of the valve housing 1060 aligned with the axial direction of the first fluid conduit 1085a is greater than a corresponding dimension of the opening 1202 as formed between opposing positions along the inner circumferential surface 1204 along the axial direction of the first fluid conduit 1085a. This difference results in the first gasket 1300 being placed in an axially compressed state between the outer circumferential surface 1090 of the circumferential wall 1069 of the valve housing 1060 and the inner circumferential surface 1204 of the housing structure 1200 when the rotary valve 1010 is fully axially received within the opening 1202, as shown in FIG. 10. Additionally, an axial dimension of the rotary valve 10 as measured between the flanged portion 1055 and the distal surface 1401 of the second gasket 1400 is also selected to be greater than the depth of the opening 1202 receiving the valve housing 1060 therein, thereby resulting in the second gasket 1400 being compressed axially between the outer axial end surface 1092 of the axial end wall 1068 and the axial end surface 1206 of the housing structure 1200 when the flanged portion 1055 of the cover 1063 engages the outer face 1230 of the housing structure 1200. The axial compression of the second gasket 1400, as well as the non-illustrated third gasket, may be further facilitated by a coupling of the flanged portion 1055 to the housing structure 1200 via a threading of each of the thread fasteners 1057 relative to each of the aligned fastener receiving openings 1250.

As shown in FIG. 10, which shows the rotary valve 1010 as fully received within the opening 1202, the first gasket 1300 is configured to provide a fluid-tight seal at the flow boundary present between the first fluid conduit 1085a and the first flow path 1211 while the second gasket 1400 is configured to provide a fluid-tight seal at the flow boundary present between the second fluid conduit 1085b and the second flow path 1212. The non-illustrated third gasket also forms a fluid-tight seal at the third fluid conduit and third flow path.

The use of the rotary valve 1010 as a form of cartridge 1010 accordingly facilitates the ability to selectively remove the cartridge 1010 from the housing structure 1200 when it is desirable to perform maintenance on the rotary valve 1010 or to replace the rotary valve 1010. The presence of the rotary valve 1010 as a cartridge 1010 also allows for the rotary valve 1010 to be tested independently of the remainder of the housing structure 1200, such as when the housing structure 1200 forms an integrated system module having multiple different components that may introduce difficulties in determining the source of any potential concerns. The described method of inserting the cartridge 1010 axially into the opening 1202 for establishing the necessary fluid-tight seals is also simplified in comparison to the connection of each of the fluid conduits to independently provided fluid lines, hoses, pipes, conduits, or the like.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A rotary disc valve comprising:
   a valve housing having an inner surface defining each of an opening, a first housing port, a second housing port, and a third housing port, each of the first housing port, the second housing port, and the third housing port providing an inlet or outlet for a fluid to enter or exit the opening of the valve housing; and
   a rotary disc valve assembly disposed within the opening of the valve housing, the rotary disc valve assembly comprising:
      a fixed disc configured to remain stationary relative to the valve housing, the fixed disc including a first flow opening providing selective fluid communication between the first housing port and the second housing port and a second flow opening providing selective fluid communication between the first housing port and the third housing port, the fixed disc including a first face and an opposing second face; and
      a rotary disc configured to rotate relative to the fixed disc about an axis of rotation of the rotary disc, the rotary disc defining a flow passage therethrough providing selective fluid communication between the first housing port and one of the first flow opening, the second flow opening, or a combination of the first opening and the second flow opening, depending on a rotational position of the rotary disc relative to the fixed disc, the rotary disc including a first face and an opposing second face, wherein the second face of the rotary disc is configured to maintain a co-planar arrangement with respect to the first face of the fixed disc to provide a fluid-tight seal therebetween where the first face of the fixed disc engages the second face of the rotary disc, wherein the rotary disc valve forms a cartridge configured to be removably inserted into an opening of a housing structure, the housing structure defining a first flow path, a second flow path, and a third flow path, wherein insertion of the cartridge into the opening of the housing structure results in the first flow path being fluidly coupled to the first housing port, the second flow path being fluidly coupled to the second housing port, and the third flow path being fluidly coupled to the third housing port, and wherein an insertion of the rotary disc valve into the opening of the housing structure includes a first gasket circumscribing the first housing port being compressed in a direction perpendicular to a direction of insertion of the rotary disc valve into the opening of the housing structure.

2. The rotary disc valve of claim 1, wherein the rotary disc valve assembly further comprises a biasing element configured to apply a biasing force to the rotary disc towards the fixed disc.

3. The rotary disc valve of claim 2, wherein the biasing force is applied to the rotary disc in a direction towards the fixed disc that is perpendicular to the co-planar arrangement present between the second face of the rotary disc and the first face of the fixed disc.

4. The rotary disc valve of claim 2, wherein the rotary disc valve assembly further comprises a drive shaft configured to drive the rotation of the rotary disc about the axis of rotation thereof, wherein the drive shaft includes an outwardly flanged portion, and wherein the biasing element extends from a first end engaging the flanged portion of the drive shaft to a second end engaging the first face of the rotary disc.

5. The rotary disc valve of claim 1, wherein the fixed disc and the rotary disc are each formed from a ceramic material.

6. The rotary disc valve of claim 1, wherein the second face of the rotary disc and the first face of the fixed disc are each formed by a ceramic material.

7. The rotary disc valve of claim 1, wherein the co-planar arrangement present between the second face of the rotary disc and the first face of the fixed disc is maintained during the rotation of the rotary disc relative to the fixed disc.

8. The rotary disc valve of claim 1, wherein the rotary disc valve assembly further comprises a drive shaft configured to rotate about an axis of rotation thereof, wherein rotation of the drive shaft about the axis of rotation thereof is configured to cause rotation of the rotary disc about the axis of rotation thereof.

9. The rotary disc valve of claim 8, wherein a distal end of the drive shaft disposed within the opening of the valve housing does not contact the fixed disc or the valve housing.

10. The rotary disc valve of claim 9, wherein the distal end of the drive shaft does not directly contact the rotary disc.

11. The rotary disc valve of claim 8, wherein the rotation of the drive shaft about the axis of rotation thereof is configured to cause the rotation of the rotary disc about the axis of rotation thereof when the axis of rotation of the drive shaft is inclined relative to the axis of rotation of the rotary disc.

12. The rotary disc valve of claim 11, wherein a clearance is present between the drive shaft and the rotary disc to accommodate the inclination of the axis of rotation of the drive shaft relative to the axis of rotation of the rotary disc.

13. The rotary disc valve of claim 8, wherein the drive shaft includes an outer circumferential surface having a first shape, the rotary disc includes a shaft receiving opening receiving the drive shaft therethrough, and the shaft receiving opening is defined by an inner circumferential surface of the rotary disc having a second shape, and wherein the rotation of the drive shaft about the axis of rotation thereof is configured to cause the rotation of the rotary disc about the axis of rotation thereof via selective engagement between the outer circumferential surface of the drive shaft and the inner circumferential surface of the rotary disc.

14. The rotary disc valve of claim 13, wherein the second shape is enlarged relative to the first shape to form a clearance between the outer circumferential surface of the drive shaft and the inner circumferential surface of the rotary disc.

15. The rotary disc valve of claim 14, wherein the clearance extends in a radial direction of the drive shaft.

16. The rotary disc valve of claim 14, wherein the clearance is present about an entirety of the outer circumferential surface of the drive shaft.

17. The rotary disc valve of claim 1, wherein the housing structure is a coolant system module of a vehicle, and wherein the first flow path, the second flow path, the third flow path are in fluid communication with a coolant of the coolant system module.

18. The rotary disc valve of claim 1, wherein the insertion of the rotary disc valve into the opening of the housing structure includes a second gasket circumscribing the second housing port being compressed in a direction parallel to the direction of insertion of the rotary disc valve into the opening of the housing structure.

* * * * *